United States Patent [19]

Baker et al.

[11] Patent Number: 4,917,389
[45] Date of Patent: Apr. 17, 1990

[54] WATER PUMP FACE SEAL ASSEMBLY

[75] Inventors: Steven F. Baker, Bellevue; Joseph L. Tengowski, Norwalk, both of Ohio

[73] Assignee: General Motors Corporation, Detroit, Mich.

[21] Appl. No.: 278,523

[22] Filed: Oct. 31, 1988

[51] Int. Cl.⁴ .............................................. F16J 5/36
[52] U.S. Cl. ........................................ 277/42; 277/89; 277/93 SD; 277/136; 277/160
[58] Field of Search ............... 277/42, 88, 89, 90, 277/43, 160, 136, 137, 92, 93 R, 93 SD

[56] References Cited

U.S. PATENT DOCUMENTS

| | | | |
|---|---|---|---|
| 2,365,065 | 12/1944 | Frankenfield | 277/43 |
| 2,608,425 | 8/1952 | Krug | 277/42 |
| 2,672,360 | 3/1954 | Chambers et al. | |
| 2,984,506 | 5/1961 | Andresen et al. | 277/42 |
| 3,075,780 | 1/1963 | Mayer | 277/59 |
| 3,120,959 | 2/1964 | Jensen et al. | 277/89 X |
| 3,191,945 | 6/1965 | Andresen | 277/88 X |
| 3,291,492 | 12/1966 | Becker | 277/42 |
| 3,361,431 | 1/1968 | Liss et al. | 277/62 |
| 3,405,948 | 10/1968 | Junker | 277/137 |
| 3,552,752 | 1/1971 | Lojkutz | 277/40 |
| 3,563,556 | 2/1971 | Scott et al. | 277/65 |
| 3,904,211 | 9/1975 | Dega | 277/32 |
| 3,985,478 | 10/1976 | Weinand | 277/160 X |
| 4,451,049 | 5/1984 | Charhut | 277/89 X |

Primary Examiner—Allan N. Shoap
Attorney, Agent, or Firm—Patrick M. Griffin

[57] ABSTRACT

A water pump face seal assembly uses a wave spring stamped from flat stock with drive tabs which, besides providing contact force and wear take up, also serves to maintain a square, concentric contact interface and to transfer torque with almost no lost motion, isolating a joint between an elastomer seal and a seal casing from twisting stress.

2 Claims, 1 Drawing Sheet

WATER PUMP FACE SEAL ASSEMBLY

BACKGROUND OF THE INVENTION

This invention relates to face seal assemblies in general, and specifically to such an assembly intended for use in a vehicle water pump.

Vehicle water pumps have an impeller drive shaft that extends through a generally circular opening in a housing filled with cooling fluid. The annular space or gap created between the shaft and housing opening must be sealed against leakage. A primary seal face is fixed to either the housing opening or to the outer surface of the shaft, with a contact surface that is normal to the shaft axis. The face seal assembly has a mounting member, typically a metal sleeve, that is installed to the other of the housing opening or the outer surface of the shaft, and a secondary seal face that contacts the primary seal face and rotates relative to it. Therefore, the face seal assembly has two basic interfaces that must be kept fluid tight, the installation interface and the seal face contact interface.

There is no relative rotation at the installation interface, so it is relatively easy to maintain it fluid tight. However, the contact interface involves very rapid relative rotation, besides being exposed to a hot, corrosive fluid and a high degree of abrasive grit, and has historically proved difficult to seal. The need to retain coolant is such that a high degree of seal torque has been acceptable at the contact interface in return for maintaining the integrity of the seal. Seal integrity at the contact interface is generally maintained by an axially resilient spring that forces the primary and secondary seal faces strongly and continually together. The spring also provides axial wear take up at the contact interface. Wear take up, in turn, requires a degree of relative axial movement with time between the secondary seal face and the mounting member, so they can not be axially fixed relative to one another. Generally, an axially flexible sealing member has been used to provide the relative axial motion needed for wear take up. The flexible sealing member is usually elastomer, and often referred to as a bellows or a boot.

The addition of the flexible sealing member to the assembly creates other potential problems that must be dealt with. Since the secondary seal face is not rigidly, directly joined to the mounting member, some means must be provided to mechanically transfer torque between the mounting member and the secondary seal face while still allowing the necessary relative axial motion between the two. Any such torque transfer means almost inevitably involves some degree of circumferential lost motion. The flexible sealing member is generally not a good candidate for the torque transfer function, because it is flexible, and would wind up and be stressed. The addition of the flexible sealing member also creates two more interfaces that must be kept fluid tight, one with the secondary sealing face, and one with the mounting member. The first of these interfaces is generally no problem, as the secondary seal face can be fairly easily embedded in a thick portion of the elastomer. The interface between the mounting member and the elastomer is more difficult, and bears the brunt of the twisting stress inherent in the torque transfer. This has prompted some seal designs to actually provide an extra, sliding seal at that interface to absorb the lost motion. Another potential problem caused by interposing a flexible sealing member between the mounting member and the secondary seal face is that it is more difficult to maintain radial concentricity between the two, which affects seal wear and efficiency. Despite the plethora of competing designs available both commercially and on paper, those skilled in the art will generally agree that state of the art water pump seal integrity and life leave ample room for improvement.

SUMMARY OF THE INVENTION

The invention provides a vehicle water pump face seal assembly of simple design and few components in which the various components cooperate to transfer torque efficiently and to maintain the integrity and alignment of the various interfaces, thereby giving a long lasting and effective seal.

In the preferred embodiment disclosed, a first seal casing includes a central mounting sleeve that press fits fluid tight to the shaft and an annular wall extending radially out from one end of the the sleeve across a continuous fold of generally U shaped cross section. The wall terminates in a coaxial cylindrical flange that is axially slotted at three evenly spaced locations. A second seal casing has a generally cylindrical skirt that surrounds the first casing sleeve. An annular wall that axially faces the first casing annular wall extends radially in from the skirt, terminating in a coaxial cylindrical flange that is also axially slotted at three evenly spaced locations and which is diagonally opposed to the first casing flange. The diameters of the cylindrical flanges differ by a predetermined amount.

An axially resilient wave spring is stamped of flat stock with a width almost equal to the diameter difference between the casing flanges. Given its width, the spring is torsionally stiff, despite its axial resilience. The spring has three complete convolutions, giving six evenly circumferentially spaced flats, three on each axial side of the space envelope occupied by the spring. The opposed casing walls act as stop surfaces, compressing the spring between them, which in turn are biased apart by the flats of the the spring. The spring fits very closely between the flanges, maintaining the casings nearly coaxial to one another. Each spring flat also includes a drive tab that fits very closely within a respective casing flange slot, thereby interlocking the casings mechanically so that torque can be transferred between them with little lost motion.

Completing the assembly is an elastomer sealing member, which has a radially inner central sleeve portion and a thickened, annular front ring in which a secondary seal face is embedded. The front of the elastomer sealing member fits closely within the second casing skirt and wall. The end of the sleeve portion is crimped tightly into the fold of the first casing, creating a fluid tight interface and retaining the casings together as a unit. Post installation, the compressed spring maintains the contacting seal faces fluid tight as well as substantially square to the shaft axis and coaxial, minimizing wear. The torsional stiffness of the spring assures that torque is transferred from the first casing to the second with little lost motion or wind up of the sealing member, isolating the crimp joint from stress and maintaining its fluid tightness. Thus, all the components of the seal cooperate to give a smooth running and long lasting unit.

It is, therefor, a general object of the invention to provide a water pump face seal assembly of simple construction, in which a small number of components cooperate to give improved operation and life.

It is another object of the invention to provide such a seal assembly by using a torsionally stiff wave spring that interlocks a pair of casings in such a way as to transfer torque with little lost motion, thereby isolating a fluid tight joint between one seal casing and an elastomer sealing member from stress.

It is yet another object of the invention to provide such an assembly in which the wave spring is formed of flat stock with a width that fits closely between a pair of radially opposed cylindrical flanges on the casings, thereby keeping them square and coaxial to one another and to the pump shaft.

It is still another object of the invention to provide such an assembly in which the end of a sleeve portion of the elastomer seal member is crimped to one of the casings so as to retain the casings together prior to installation, while also providing a fluid tight joint after installation that is isolated from twisting stress by the torsionally stiff wave spring.

DESCRIPTION OF THE PREFERRED EMBODIMENT

These and other objects and features of the invention will appear from the following written description, and from the drawings, in which.

Figure 1:
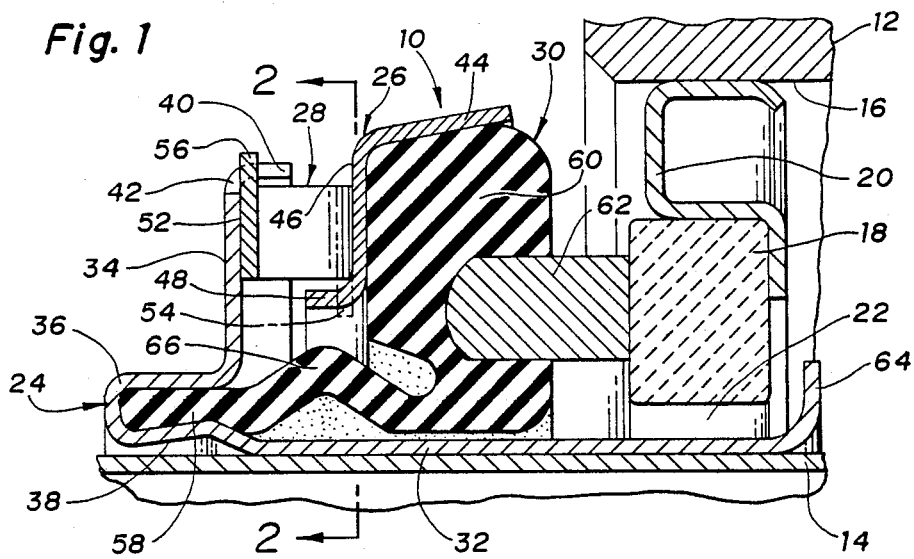
FIG. 1 is a cross sectional view of a preferred embodiment of the invention after installation, showing a portion of the shaft and housing opening.

Referring first to FIG. 1, a preferred embodiment of the face seal assembly of the invention is indicated generally at 10. Assembly 10 is used in conjunction with a water pump housing 12 and a rotatable water pump shaft 14 that extends through a circular opening 16 in housing 12. More specifically, shaft 14 extends through a ceramic primary seal face 18 mounted fluid tight within opening 16 by a retainer 20, thereby creating an annular space 22 that must be sealed. Shaft 14 would be supported for coaxial rotation by a bearing fixed to the housing 12, not illustrated. Seal assembly 10 is installed to and turns with shaft 14, in a manner more fully described below. It should be understood, however, that primary seal face 18 could instead be fixed to shaft 14, while seal assembly 10 could be installed in housing opening 16, with suitable changes in size, of course. The version disclosed is felt to be most practical, however, as the primary seal face 18 is thereby exposed on one side to the ambient, so that it can run cooler and is more accessible. The four basic components of the assembly 10 are a first casing, indicated generally at 24, a second casing surrounding it and indicated generally at 26, a wave spring indicated generally at 28, and an elastomer sealing member indicated generally at 30. Details of these four components will be next described.

Figure 3:
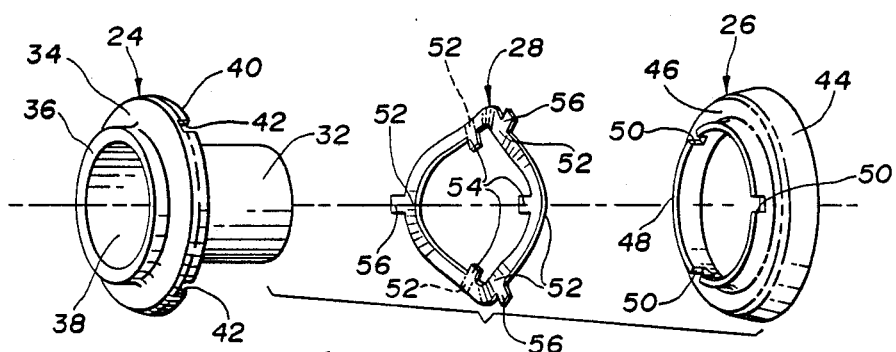
FIG. 3 is an exploded perspective view of the two casings and spring prior to assembly.

Referring next to FIGS. 1 and 3, first casing 24 is integrally stamped from sheet steel with a central mounting sleeve 32 sized so as to make a tight press fit with the outer surface of shaft 14, thus serving as a mounting member. An annular wall 34 normal to the axis of sleeve 32 is integral to the outside of a continuous cylindrical fold 36 of generally U shaped cross section at the left end of sleeve 32. It will be noted by comparing FIG. 3 to 1 that the inner surface of fold 36 is straight prior to assembly, but is deformed out on its inner surface at 38 after assembly, for a purpose described below. Annular wall 34 terminates in a coaxial cylindrical flange 40 that extends axially to the right and which is axially slotted at three evenly spaced locations 42. The fold 36 is sufficiently rigid that when sleeve 32 is installed to shaft 14, wall 34 is maintained square to the axis of shaft 14, and flange 40 is kept coaxial to shaft 14.

Still referring to FIGS. 1 and 3, second casing 26 is also integrally stamped of sheet steel, with a generally cylindrical skirt 44 that surrounds sleeve 32. An annular wall 46 integral with skirt 44 terminates in a coaxial cylindrical flange 48 of smaller diameter than flange 40 that extends axially opposite to flange 48. Flange 48 is also axially slotted at three evenly spaced locations 50. At the installation position of FIG. 1, the annular walls 34 and 46 are axially opposed, while the flanges 40 and 48 are diagonally opposed with a predetermined radial spacing equal to half their diameter difference. Wave spring 28 is stamped from flat spring steel stock with a width that is close to that radial spacing. Given its width, spring 28 is torsionally stiff, but is axially resilient, with three complete convolutions that create six evenly circumferentially spaced flats 52, three on each axial side. Each flat 52 has an integral square tab, three inner tabs 54, and three outer tabs 56 altogether. Tabs 54 and 56 have a width just less than slots 42 and 50 respectively. The final component of assembly 10, elastomer sealing member 30, is molded with a central sleeve portion 58 and a thicker ring 60 at the front in which a secondary seal face 62 is firmly embedded. These four basic components cooperate to give an easily assembled unit with improved operation, as will be next described.

Figure 2:
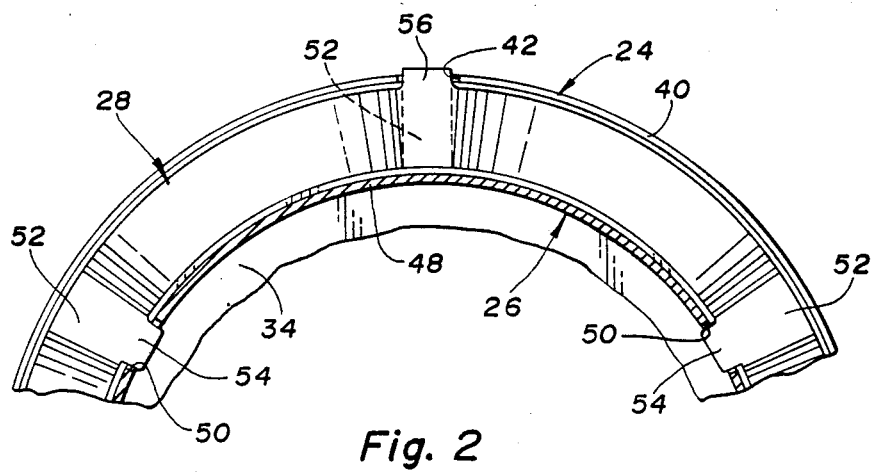
FIG. 2 is a sectional view taken along the line 2—2 of FIG. 1.

Referring next to FIGS. 1 and 2, to assemble the components, ring 60 is pressed into skirt 44, fitting tightly enough to prevent relative rotation. Then, outer spring tabs 56 are fitted within first casing slots 42 and the second casing wall 46 is moved co axially toward the first casing wall 34 and twisted as necessary until the spring inner tabs 54 enter the slots 50, which mechanically interlocks the walls 34 and 46. This is continued until the end of sleeve 58 enters the casing fold 36 as far as possible, compressing spring 28. The walls 34 and 46 are held in that position temporarily manually, or by a suitable jig, with no tension on the sleeve 58, until the fold 36 can be deformed radially out at 38 with a suitable tool, such as an arbor press. First casing wall 34, since it lies in a plane normal to the axis of sleeve 32 and is nearly axially aligned with fold 36, acts to significantly radially stiffen the outside of fold 36 during this step, so that it need not be backed up or supported. Once fold 36 is deformed out at 38, as best seen in FIG. 1, the end of elastomer sleeve 58 will be mechanically locked to first casing 24, fluid tight within fold 36. Then, the holding force on the opposed casing walls 34 and 46 can be released, whereupon spring 28 can expand between the stop surfaces provided by the opposed walls 34 and 46. Spring 28 will expand until elastomer sleeve 58 is taut. The assembly 10 is thus effectively unitized, as sleeve 58 cannot be easily pulled from the crimped fold 36. If desired, the primary seal face 18 and its retainer 20 can be further unitized to the assembly 10 by turning the right end of sleeve 32 out, as at 64. To install the assembly 10, it is pushed axially into the annular space 22 along with the retainer 20. Retainer 20 and primary seal face 18 are pushed in slightly farther, so that sleeve 58 goes from tension to slight compression, creating a slight bulge at at 66. Bulge 66 rests inside of second casing flange 48, and so is protected from contact with the sharp edges of the spring 28.

Referring next to FIG. 1, after installation, the seal assembly 10 rotates one to one with shaft 14. There is enough area in contact between the inner surface of sleeve 32 and the outer surface of shaft 14 that the installation interface they form is fluid tight. Spring 28 maintains the contact interface between the seal faces 18 and 62 fluid tight. There is a good deal of area in contact between the spring flats 52 and the inner surfaces of the opposed casing walls 34 and 46, more so than would be the case with a spring formed of round wire or a flat stock spring of lesser width. As a consequence, the second casing 26 is very stably supported against tilting off axis relative to first casing 24, and the secondary sealing face 62 is thereby kept square to the axis of shaft 14. This helps to decrease wear at the contact interface. Another consequence of the width of spring 28 is that the inner and outer edges of the spring flats 52, as well a small portion of spring 28 to either side of each flat 52, rests within the diagonally opposed flanges 40 and 48 with a very little radial clearance. Therefore, second casing 26 cannot move eccentrically relative to first casing 24 to any great degree, nor can the contacting seal faces 18 and 62, which also serves to reduce wear.

Referring next to FIG. 2, it will be noted that the spring tabs 54 and 56 rest within their respective casing slots 42 and 50 with a very small clearance. The clearance is enough that the spring 28 can expand axially without binding to compensate for wear at the contact face, but the casings 24 and 26 will not be able to twist relative to one another to any appreciable degree. Thus, torque is transferred from the sleeve 32 to the second casing 26 very efficiently, with little lost motion. This prevents any significant twisting stress at the juncture between the elastomer sleeve 58 and fold 36, keeping that interface fluid tight. Thus, despite the small number and simplicity of the components, there is a high degree of cooperation between and among them, contributing to improved and lengthened operation.

Variations of the preferred embodiment disclosed could be made. As already mentioned, the seal assembly 10 and primary seal face 18 could be reversed. A narrower wave spring, even one formed from round stock that that did not fit as closely between the flanges 40 and 48, would still be torsionally stiffer than a coil spring, for example. Thus, it would still act as an efficient means to transfer torque between the first and second casings, protecting the juncture between the elastomer sealing member and the first casing. However, making the wave spring 28 from flat stock with the width shown adds an extra level of cooperation between the components in terms of concentricity control and in terms of controlling the contact interface. A different type of joint between the sealing member and the first casing could be used, such as adhesive. The crimped fold 36 shown is very simple, practical, and convenient to form, however, and serves to unitize the various components without jeopardizing their relative alignment and concentricity. Therefore, it will be understood that it is not intended to limit the invention to just the preferred embodiment disclosed.

The embodiments of the invention in which an exclusive property or privilege is claimed are defined as follows:

1. A face seal assembly for sealing a generally annular space formed between a primary seal face fixed to a fluid filled housing and the outer surface of a rotatable cylindrical shaft that extends through a central opening in said primary seal face, comprising,
    a first casing having a cylindrical sleeve sized to fit non-turnably and fluid tight to said shaft outer surface and also having a wall extending radially out from said sleeve via a connecting structure thereto and being generally normal to the axis of said sleeve and terminating in a cylindrical flange extending from said wall in one axial direction, said cylindrical flange further having a plurality of slots therethrough,
    a second casing surrounding said first casing sleeve having a generally cylindrical skirt and a wall extending radially inwardly from said skirt generally normal to the axis of said skirt and terminating in a cylindrical flange of lesser diameter than said first casing cylindrical flange and extending in the opposite axial direction, said cylindrical flange also having a plurality of slots therethrough,
    an axially resilient, generally annular wave spring that is formed of flat stock with a width substantially equal to half the difference in diameters between said casing cylindrical flanges, and which therefore will fit closely between said cylindrical flanges when it is compressed between said casing walls to bias them apart, said wave spring further being torsionally stiff by virtue of its width and also having a plurality of inner and outer tabs receivable through said first and second casing slots so as to mechanically interlock said casing cylindrical flanges to efficiently transmit torque from said first to said second casing with substantially no lost motion, and,
    an elastomer sealing member having a radially inner portion joined fluid tight to said first casing and a radially outer portion that is non turnably held inside said second casing and which holds a secondary seal face resiliently against said primary seal face under the bias of said wave spring,
    whereby, said annular space is completely sealed relative to said fluid filled housing, and the sealing juncture of said elastomer sealing member and said first casing is substantially isolated from stress by virtue of the efficient transmission of torque by said wave spring and by virtue of the close fit of said wave spring between said casing flanges, which maintains said casings substantially coaxial to one another.

2. A cartridge face seal assembly for sealing a generally annular space formed between a primary seal face fixed to a fluid filled housing and the outer surface of a rotatable cylindrical shaft that extends through a central opening in said primary seal face, comprising,
    a first casing having a cylindrical sleeve that is adapted to be installed fluid tight and non-turnably to said shaft outer surface and also having an integral wall extending radially out from said sleeve via a connecting structure and being generally normal to the axis of said sleeve, said connecting structure comprising a fold of generally U shaped cross section deformed so as to be spaced radially outwardly from the shaft, said integral wall further being substantially axially aligned with said fold so as to be capable of providing stiffening for said fold,
    a second casing surrounding said first casing sleeve having a generally cylindrical skirt and a wall extending radially inwardly from said skirt generally normal to the axis of said skirt, an axially resilient wave spring that is torsionally stiff and which is compressed between said first and second casing walls so as to bias them axially apart, said wave spring further being mechanically interlocked between said first and second walls so as to efficiently transmit torque from said first to said second casing with substantially no lost motion by virtue of said spring's torsional stiffness, and, an elastomer sealing member having a radially inner sleeve portion that is crimped tightly into said first casing fold as it is deformed radially outwardly so as to provide a fluid tight juncture and so as to retain said seal to said first casing, said seal also having a radially outer portion that is non-turnably held inside said second casing skirt and wall and which holds a secondary seal face, whereby, prior to installation of said first casing, said second casing is retained to said first casing by said seal sleeve portion, while after installation, the fluid tight juncture of said seal sleeve portion and said first casing is substantially isolated from stress by virtue of the efficient transmission of torque by said wave spring.

* * * * *